(12) United States Patent
Grondahl

(10) Patent No.: US 6,644,667 B2
(45) Date of Patent: Nov. 11, 2003

(54) SEAL ASSEMBLY AND ROTARY MACHINE CONTAINING SUCH SEAL

(75) Inventor: Clayton M. Grondahl, Rexford, NY (US)

(73) Assignee: CMG Tech, LLC, Rexford, NY (US)

( * ) Notice: Subject to any disclaimer, the term of this patent is extended or adjusted under 35 U.S.C. 154(b) by 0 days.

(21) Appl. No.: 09/791,248

(22) Filed: Feb. 23, 2001

(65) Prior Publication Data

US 2002/0117806 A1 Aug. 29, 2002

(51) Int. Cl.⁷ .................... F01D 11/02; F16J 15/44; F16J 15/447

(52) U.S. Cl. .................... 277/355; 277/303

(58) Field of Search .................... 277/355, 303

(56) References Cited

U.S. PATENT DOCUMENTS

| | | | |
|---|---|---|---|
| 3,917,150 A | | 11/1975 | Ferguson et al. |
| 4,204,629 A | | 5/1980 | Bridges |
| 4,209,268 A | * | 6/1980 | Fujiwara et al. ............ 277/355 |
| 4,274,575 A | | 6/1981 | Flower |
| 4,645,217 A | | 2/1987 | Honeycutt, Jr. et al. |
| 4,940,080 A | | 7/1990 | Reeves et al. |
| 5,029,875 A | | 7/1991 | Spain et al. |
| 5,042,823 A | | 8/1991 | Mackay et al. |
| 5,066,024 A | | 11/1991 | Reisinger et al. |
| 5,071,138 A | | 12/1991 | Mackay et al. |
| 5,074,748 A | | 12/1991 | Hagle |
| 5,076,590 A | | 12/1991 | Steinetz et al. |
| 5,090,710 A | | 2/1992 | Flower |
| 5,100,158 A | * | 3/1992 | Gardner ............ 277/411 |
| 5,106,104 A | | 4/1992 | Atkinson et al. |
| 5,108,116 A | * | 4/1992 | Johnson et al. ............ 277/355 |
| 5,201,530 A | | 4/1993 | Kelch et al. |
| 5,316,318 A | * | 5/1994 | Veau ............ 277/355 |
| 5,568,931 A | | 10/1996 | Tseng et al. |
| 5,630,590 A | | 5/1997 | Bouchard et al. |
| 5,688,105 A | | 11/1997 | Hoffelner |
| 5,704,760 A | | 1/1998 | Bouchard et al. |
| 5,755,445 A | * | 5/1998 | Arora ............ 277/418 |
| 5,794,938 A | | 8/1998 | Hofner et al. |
| 5,794,942 A | | 8/1998 | Vance et al. |
| 5,799,952 A | | 9/1998 | Morrison et al. |
| 5,961,125 A | | 10/1999 | Wolfe et al. |
| 5,961,280 A | | 10/1999 | Turnquist et al. |
| 5,975,535 A | | 11/1999 | Gail et al. |
| 5,987,879 A | * | 11/1999 | Ono ............ 60/800 |
| 5,997,004 A | | 12/1999 | Braun et al. |
| 6,010,132 A | | 1/2000 | Bagepalli et al. |
| 6,012,723 A | | 1/2000 | Beeck |
| 6,027,121 A | | 2/2000 | Cromer et al. |
| 6,030,175 A | | 2/2000 | Bagepalli et al. |

(List continued on next page.)

OTHER PUBLICATIONS

Arora, Gul K. et al., "Pressure Balanced, Low Hysteresis, Finger Seal Test Results," 35th Joint Propulsion Conference and Exhibit, Los Angeles, California, Jun. 20–24, 1999.

(List continued on next page.)

Primary Examiner—Anthony Knight
Assistant Examiner—Michael J. Kyle
(74) Attorney, Agent, or Firm—Hoffman, Warnick & D'Alessandro LLC; Spencer K. Warnick

(57) ABSTRACT

A seal assembly which, among other applications, may be used for sealing fluid leakage between a steam or combustion (gas) turbine rotor and a turbine stator body. The seal assembly includes elements having a plurality of spaced seal members with slots therebetween. Each seal member is angled between a fixed end and a free end thereof, and the free ends slidably engage the rotatable component. The elements may be juxtaposed such that seal members of each element block slots of another element. A method of inhibiting fluid flow and a method of fabricating the seal assembly are also disclosed.

27 Claims, 12 Drawing Sheets

U.S. PATENT DOCUMENTS

| | | | |
|---|---|---|---|
| 6,032,959 | A | 3/2000 | Carter |
| 6,042,119 | A | 3/2000 | Bagepalli et al. |
| 6,045,134 | A | 4/2000 | Turnquist et al. |
| 6,059,526 | A | 5/2000 | Mayr |
| 6,079,714 | A | 6/2000 | Kemsley |
| 6,079,945 | A | 6/2000 | Wolfe et al. |
| 6,105,966 | A | 8/2000 | Turnquist et al. |
| 6,105,967 | A | 8/2000 | Turnquist et al. |
| 6,116,608 | A | 9/2000 | Wolfe et al. |
| 6,120,622 | A | 9/2000 | Mayr et al. |
| 6,131,910 | A | 10/2000 | Bagepalli et al. |
| 6,131,911 | A | 10/2000 | Cromer et al. |
| 6,139,018 | A | 10/2000 | Cromer et al. |
| 6,139,019 | A | 10/2000 | Dinc et al. |
| 6,161,836 | A | 12/2000 | Zhou |
| 6,168,162 | B1 | 1/2001 | Reluzco et al. |
| 6,170,831 | B1 | 1/2001 | Bouchard |
| 6,173,958 | B1 | 1/2001 | Dinc et al. |
| 6,173,962 | B1 | 1/2001 | Morrison et al. |
| 6,267,381 | B1 * | 7/2001 | Wright ........................ 277/355 |
| 6,352,263 | B1 * | 3/2002 | Gail et al. .................. 277/355 |
| 2001/0030397 | A1 * | 10/2001 | Beichl. ....................... 277/355 |

OTHER PUBLICATIONS

Steinetz, Bruce M. et al., "Advanced Seal Technology Role in Meeting Next Generation Turbine Engine Goals," Propulsion and Power Systems First Meeting on Design Principles and Methods for Aircraft Gas Turbine Engines, Toulouse, France, May 11–15, 1998.

"Performance and Reliability Improvements for HeavyDuty Gas Turbines," GE Power Systems GER–3571H, Apr. 2000, pp. 5–6.

Hendricks, Robert C. et al., "Two–way brush seals catch a wave," 1997 International Gas Turbine & Aeroengine Congress & Exhibition, Orlando, Fl.

"Retractable brush seal optimizes efficiency and availability for cycling and baseloaded steam turbines," http://www-.demagdelaval.com.

"Brush seals," http://www.crossmanufacturing.com.

"Brush Sealing Technology for Gas Turbines," http://www-.powmat.com.

* cited by examiner

SEAL ASSEMBLY AND ROTARY MACHINE CONTAINING SUCH SEAL

BACKGROUND OF THE INVENTION

1. Technical Field

The present invention relates generally to seals for rotary machines and, more particularly, to a seal assembly and rotary machine containing such seal.

2. Related Art

In many rotary machines, such as a gas turbine or jet engine, a gas is compressed in a compressor and mixed with a fuel source in a combustor. The combination of gas and fuel is then ignited for generating combustion gases that are directed to turbine stage(s) that derive energy therefrom. Both turbine stage(s) and compressor have stationary or non-rotating components, e.g., vanes, that cooperate with rotating components, e.g., blades, for compressing and expanding the operational gases. The operational gases change in pressure through the machine and a variety of seals are provided to preserve the differential pressures where necessary to maximize machine efficiency and performance. An exemplary seal may be provided between a turbine rotor and a cooperating stator or stator body so the rotor may be pressurized to provide thrust balance relative to the rearwardly directed force generated by the engine and the forward direction of the engine.

In the above-described settings, turbine components and seals exceed the operating temperature range of flexible organic compound elastomer seals used in lower temperature applications. Accordingly, seals used must be capable of operation in a high temperature environment. In addition, the seals used must address the close operating clearances required in machinery of this type. Rotary machine seal design also requires consideration of the relative motion between components produced by the differential thermal expansion that occurs throughout the machinery operating cycle compared to cold clearance at assembly.

One structure commonly provided to control leakage flow along a turbine shaft or other rotating surface is a labyrinth seal. In this setting, a variety of blocking seal strips and obstructions are used between stationary turbine components. Solid labyrinth seals typically have a relatively large clearance to avoid rub damage. Labyrinth seals, therefore, do not maximize machine performance.

Another commonly used seal is a brush seal, which include a pack of metal bristles that contact a rotor at free ends thereof to maintain a seal with the rotor. The bristles may be inclined relative to the rotor and may be supported by plates. Brush seals have been aggressively pursued in recent years to provide tighter clearances in rotating machinery seal designs because they have some resilience to accommodate rubbing against the rotating component. For instance, in U.S. Pat. No. 5,090,710, issued to Flower, a brush seal is comprised of closely packed fine wires or filaments that are weld assembled in a carrier assembly that is then inserted in a machine with the bristles wiping the rotating surface. The bristles and assembly are fabricated of materials suitable for the fluid temperature and, compared to a labyrinth seal, leakage is reduced through and past the bristles in close contact with the rotating surface.

Brush seals, however, pose a number of deficiencies. First, the multistep brush seal manufacturing process is costly. Second, brush seal bristles do not always maintain a close running clearance because of their inherent inability to withstand long term wear. Third, brush seals exposed to solid particles are subject to erosion or other deterioration. Finally, brush seals are also subject to vibration due to movement of the pressurized fluid being sealed. Therefore, brush seals oftentimes require dampening features.

Another type seal is disclosed in U.S. Pat. Nos. 5,042,823 and 5,071,138, both issued to Mackay et al. These disclosures reveal a laminated finger seal providing a planar array of radially and circumferentially extending fingers separated by gaps. This structure suffers from a number of disadvantages. For instance, each stacked lamination is a solid ring (not segmented) and, therefore, is limited in application to large diameter machines that require installation/replacement without rotor removal. In addition, the finger geometry provided is provided in a substantially radial plane, which may prevent adequate flexure of the fingers.

In view of the foregoing, there is a need in the art for a seal assembly having low cost manufacture and capable of withstanding the operational sensitivities described above.

SUMMARY OF THE INVENTION

In accordance with the invention a seal assembly is provided that has a number of seal members or "leaf" seals. The seal assembly may be manufactured from rolled shim stock using wire electro-discharge manufacturing (EDM) to make narrow, precision slots to produce the desired seal member geometry. The seal members may be angled between their free ends and their fixed ends and may include a support for supporting the angle. The invention provides similar benefits as brush seals and finger seals in rotary machine applications but at lower cost and with more robust attributes. Seal member geometry is engineered with respect to thickness, width, length, and number of members to meet specific application requirements of differential pressure and anticipated differential motion. The support serves to limit member movement in one direction and withstand differential pressure, while force imposed by a rub engagement on a rotating component is reduced with the elastic flexure of the seal assembly. Seal member end geometry may be shaped to provide a precision diameter and may also incorporate geometry for aerodynamic lift that would minimize wear in those rotor seal applications that anticipate a heavy transient rub.

In a first aspect of the invention is provided a seal assembly for sealing against a rotatable component, the seal assembly comprising: a first element including a plurality of spaced seal members having slots therebetween; a second element including a plurality of spaced seal members having slots therebetween; and wherein each seal member is angled between a fixed end and a free end thereof, and the free ends slidably engage the rotatable component to seal thereagainst.

A second aspect of the invention provides a rotary machine comprising: a rotatable component and a non-rotatable component, the components lying about a common axis; a seal assembly between the components, the seal assembly including: a plurality of juxtaposed elements, each element including a plurality of spaced seal members defining slots therebetween, each seal member including an angle disposed between a fixed end and a free end thereof, wherein the free ends slidably engage the rotatable component to seal thereagainst; and a support for supporting the angle of each seal member.

In a third aspect of the invention is provided a method of inhibiting fluid flow through an annular slot defined between a stator body and a rotor received in the stator body, the rotor having a longitudinal axis, the method including the steps of:

disposing on the stator body a plurality of arcuate elements each having a band portion and an integral plurality of circumferentially disposed seal members having slots therebetween, wherein the seal members include an angle therein and extend inwardly from the stator body at an angle relative to the longitudinal axis to slidably contact the rotor along a circumference thereof; circumferentially aligning and axially juxtaposing the elements; employing the cooperatively disposed elements to define an annular seal extending between the stator body and the rotor; and inhibiting fluid flow through the annular slot with the annular seal.

In a fourth aspect of the invention is provided a method of fabricating a seal assembly for sealing pressurized chambers of a rotary machine having a stator body and a rotor, the method comprising the steps of: (a) cutting slots axially into an edge of a material to form a plurality of seal members; (b) layering the material; (c) securing the layers of material together; (d) forming an angle in the seal members; and (e) coupling the layers of material to a holder that is adapted to be coupled to a stator body of the rotary machine, whereby the seal members slidably engage the rotor of the rotary machine, when in operation, to seal the pressurized chambers.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE PREFERRED EMBODIMENTS

Figure 1:
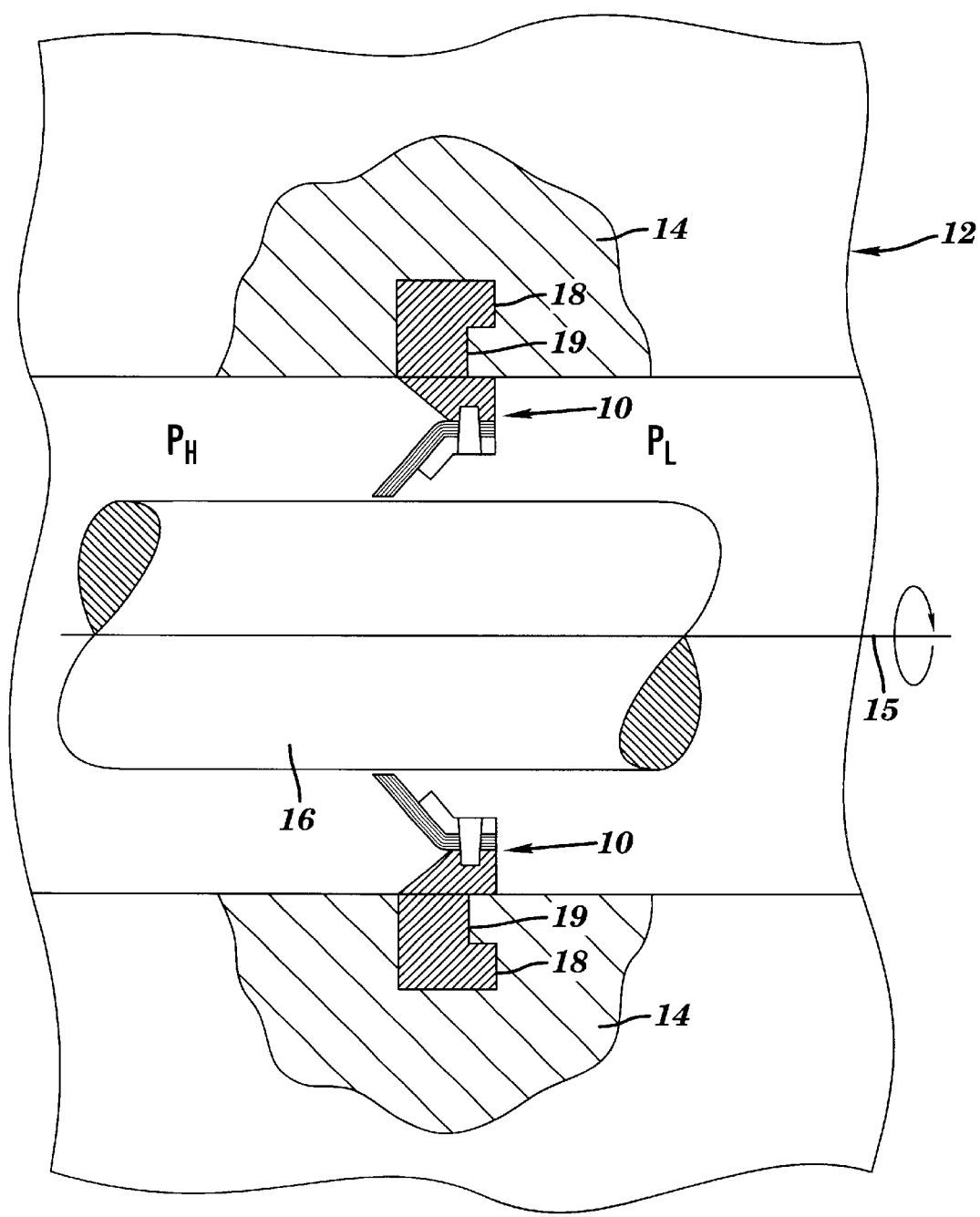
FIG. 1 shows a rotary machine including a first embodiment of a seal assembly in accordance with the present invention.
Figure 2:
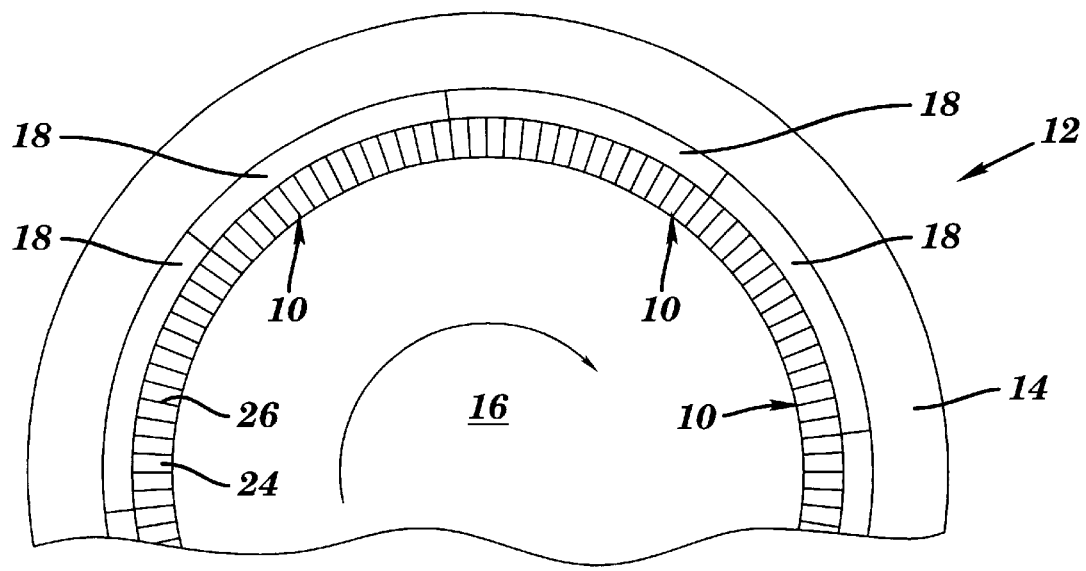
FIG. 2 shows a rotary machine including a number of arcuate seal assemblies.

Referring to FIGS. 1 and 2, the present invention provides a seal assembly 10 for use with a rotary machine 12. Rotary machine 12 may be any well known machinery that includes a non-rotating component 14 and a rotating component 16 having a longitudinal axis 15, e.g., a gas turbine, a jet engine, a steam turbine, etc. For description purposes, the present invention will be described in terms of a steam or combustion (gas) turbine having a stator or stator body 14 and a rotor 16. As shown in FIG. 1, a higher pressure chamber $P_H$ and a lower pressure chamber $P_L$ are generated during steady state operation of rotary machine 12. Pressure from higher pressure chamber $P_H$ is exerted against at least part of seal assembly 10, which acts to seal higher pressurize chamber $P_H$ from lower pressure chamber $P_L$. FIG. 2 shows an embodiment of rotary machine where a number of arcuate seal assemblies 10 are utilized about rotating component 16.

Figure 3:
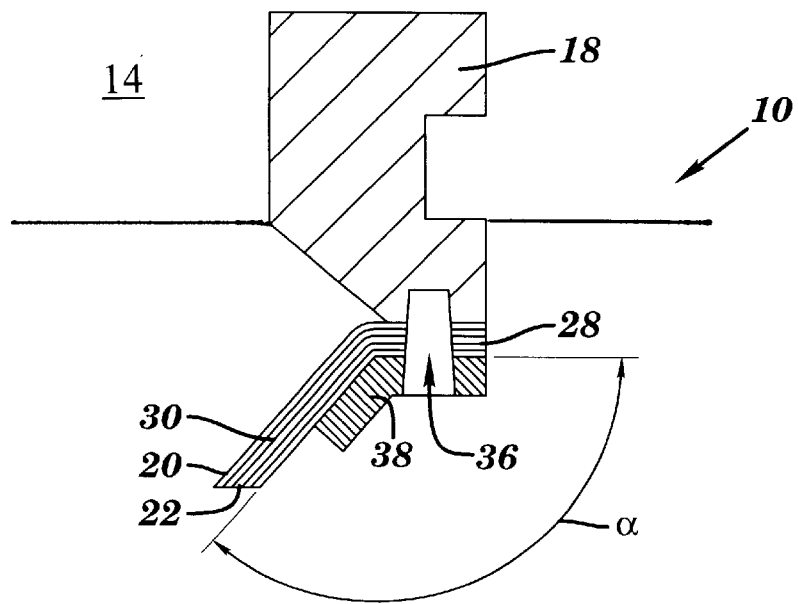
FIG. 3 shows a cross-sectional view of the first embodiment of the seal assembly of FIG. 1.
Figure 4:
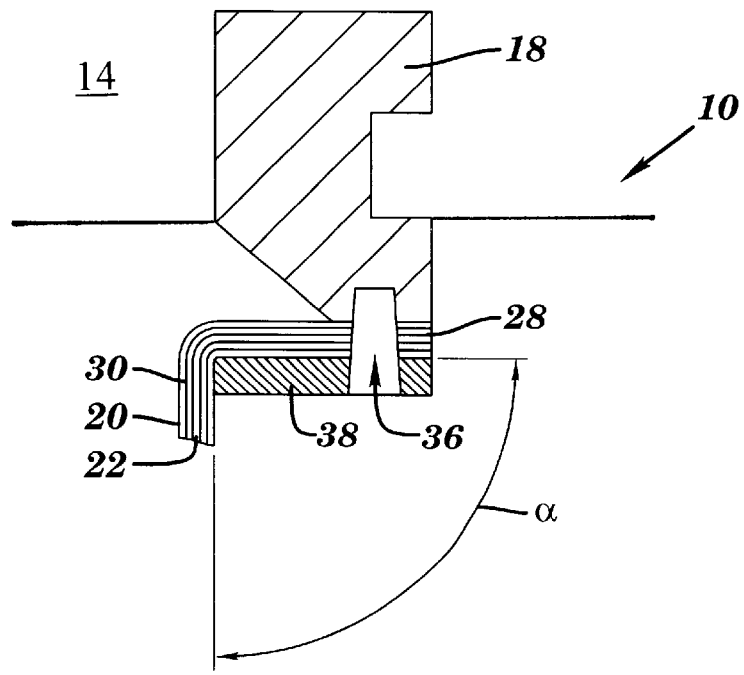
FIG. 4 shows a cross-sectional view of a second embodiment of the seal assembly.

Turning to FIGS. 3 and 4, seal assembly 10 includes at least a first element 20 and a second element 22, and preferably three or more elements 20, 22. Elements 20, 22 are layered together (juxtaposed) and carried by non-rotating component 14. Elements 20, 22 are preferably made of a heat resistant material, e.g., a nickel-based or cobalt alloy material. Elements 20, 22 also have a thickness, width, length and number set to meet application requirements such as differential pressure and differential motion of the particular rotary machine 12 at issue. In a preferred embodiment, elements 20, 22 are coupled to a holder 18 that is coupled to non-rotating component 14. Each seal assembly 10 is preferably provided as an arcuate structure such that a number of seal assemblies 10 can be circumferentially disposed about rotating component 16 to create a seal. In this case, as shown in FIG. 1, holder 18 is preferably non-rotatably held in a key slot 19 of non-rotating component 12 that is concentric with rotating component 16. As an alternative embodiment, however, seal assembly 10 may be provided as an annulus and elements 20, 22 may be provided by a spiral of a single strip of material. While a particular structure has been disclosed for holding seal assembly 10, it should be recognized that a number of other mechanisms of mounting seal assembly 10 to non-rotating component 14 may be possible.

Figure 5:
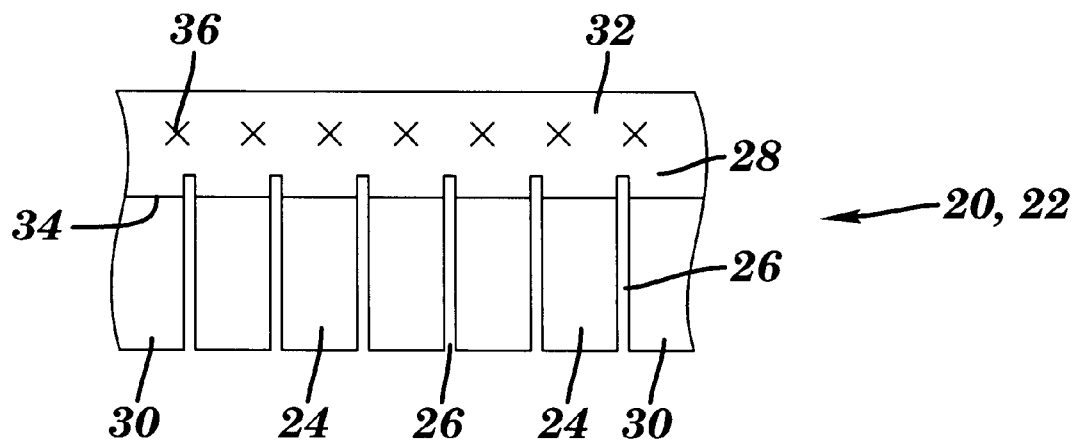
FIG. 5 shows a detail view of a first embodiment of seal members of an element of the seal assembly.

FIG. 5 illustrates how each element 20, 22 includes a plurality of spaced leaf seal members 24 having slots 26 therebetween. Each seal member 24 includes a fixed end or portion 28 and a free end or portion 30. While a variety of mechanisms may be used to fix ends 28, preferably each fixed end 28 is provided by forming scaled members 24 integrally with a band portion 32 of each element 20, 22. Once assembled, band portions 32 of each element 20, 22 are preferably coupled to form a single band portion to prevent relative motion of the elements 20, 22 by welding at or near fixed ends 28 of each seal member 24. A weld 36 may be provided through elements 20, 22 and a support 38

(discussed below) to couple them to holder 18. Weld 36 may be provided as, for example, a laser or electron beam weld.

Figure 6:
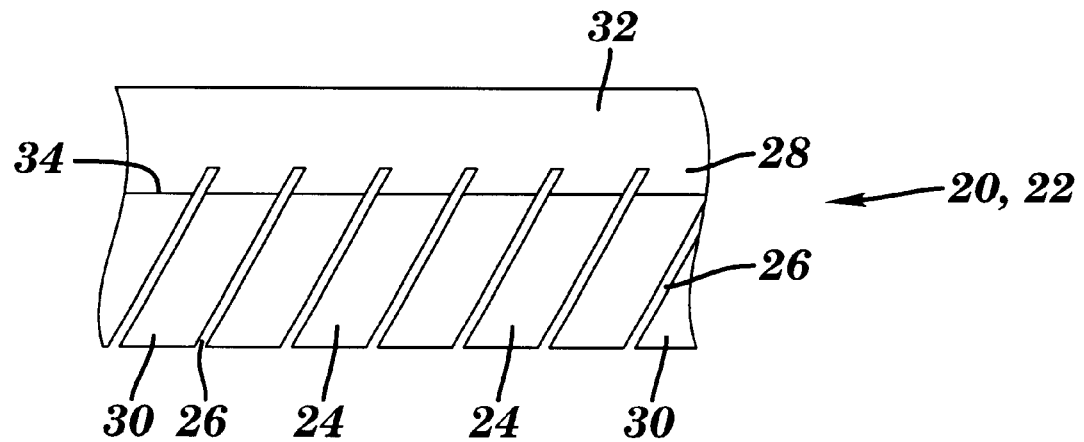
FIG. 6 shows a detail view of a second embodiment of seal members of an element.
Figure 7:
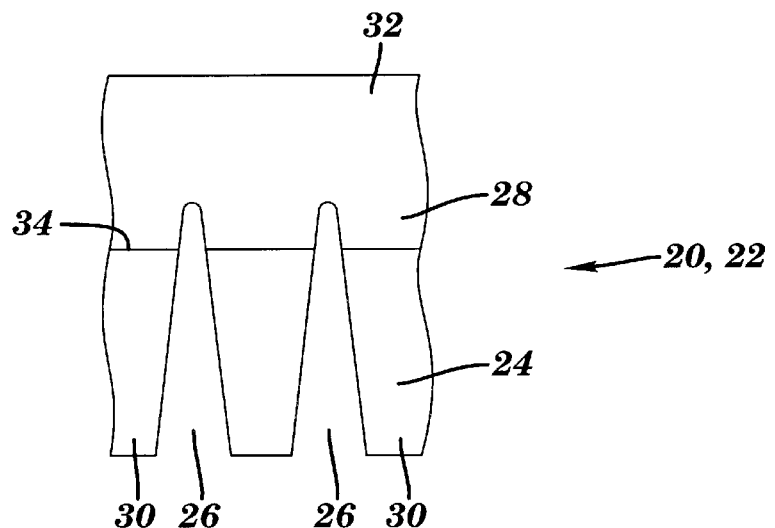
FIG. 7 shows a detail view of a third embodiment of seal members of an element.
Figure 8:
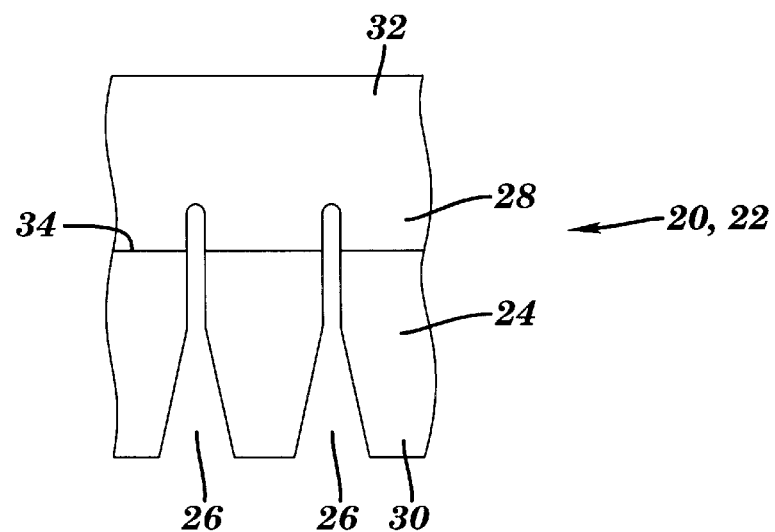
FIG. 8 shows a detail view of a fourth embodiment of seal members of an element.
Figure 9:
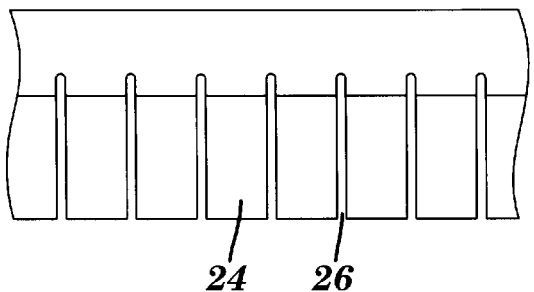
FIG. 9 shows a detail view of a fifth embodiment of seal members of an element.
Figure 10:
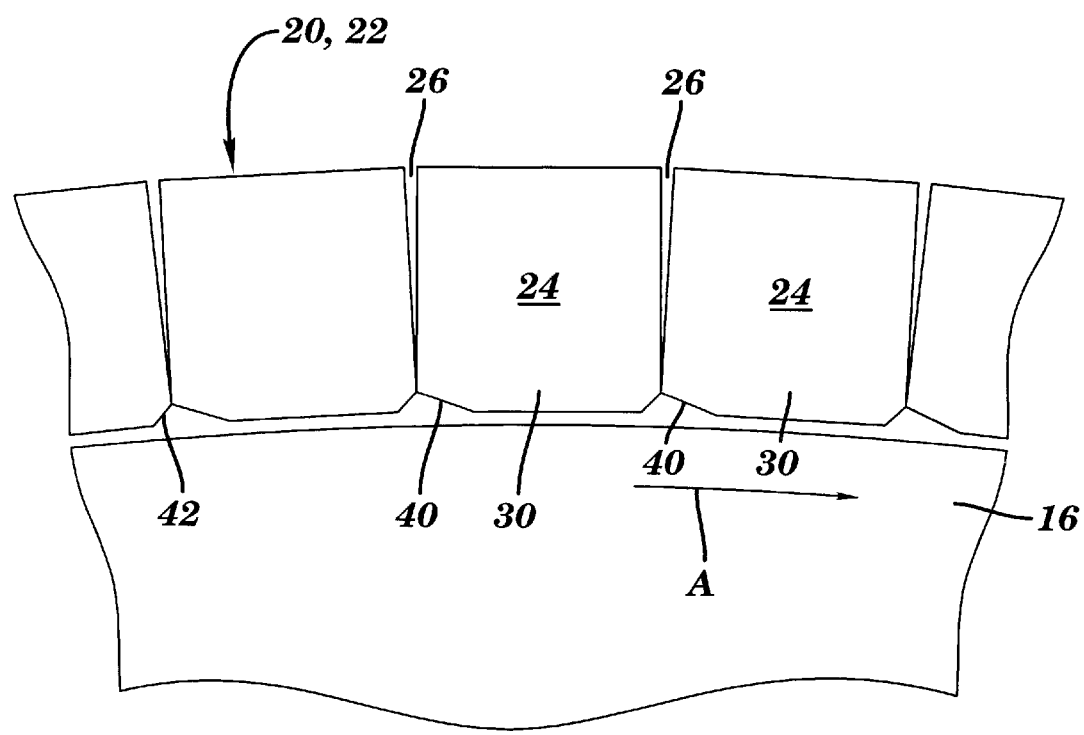
FIG. 10 shows a partial detail view of an element mounted adjacent a rotating component of a rotary machine.

As illustrated in FIGS. 5–9, slots 26 may be provided in a variety of shapes and dispositions in elements 20, 22. In FIG. 5, slots 26 are provided in elements 20, 22 such that they extend substantially perpendicular to free ends 30. FIG. 6 illustrates slots 26 that extend at a substantially non-perpendicular angle relative to free ends 30. FIGS. 7 and 8 illustrate slots 26 that diverge at least partially from fixed end 28 to free end 30. A divergent configuration may be advantageous where seal members 24 interfere with one another when seal assembly 10 is mounted, e.g., on a small rotatable component 16. For instance, as shown in FIG. 10, when a seal assembly 10 is mounted, elements 20, 22 are arced such that seal members 24 converge at their free ends 30. Divergent slots may prevent interference between free ends 30 of adjacent seal members 24. In FIG. 7, slots 26 are V-shaped, and in FIG. 8, slots 26 are funnel-shaped. FIG. 9 illustrates that seal members 24 do not have to be uniformly spaced in each element 20, 22. That is, seal members 24 may be different circumferential widths.

Figure 11:
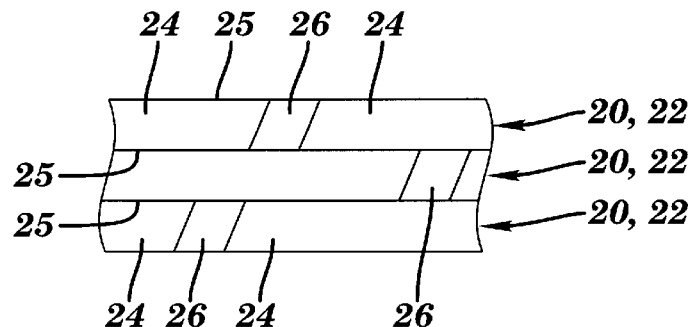
FIG. 11 shows a detail view of a number of elements configured with staggered slots.
Figure 12:
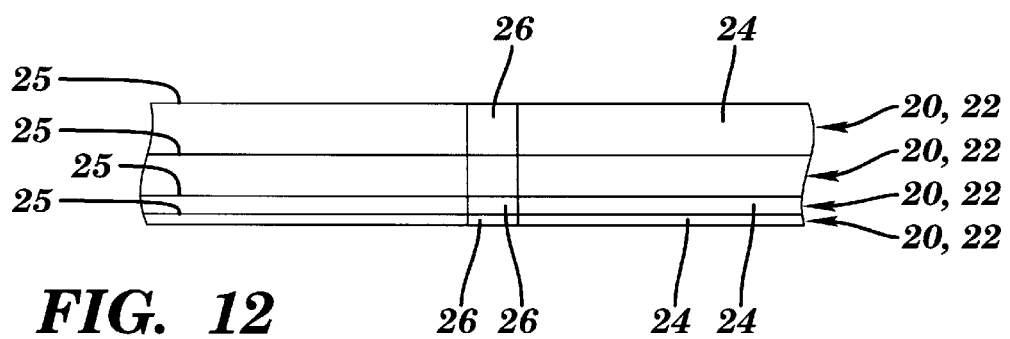
FIG. 12 shows a detail view of a number of elements configured with non-staggered slots.

Turning to FIG. 11, slots 26 may also be provided at a non-perpendicular angle relative to a surface 25 of each element 20, 22. FIG. 11 also illustrates how, in a preferred embodiment, slots 26 of elements 20, 22 are staggered between elements 20, 22. That is, elements 20, 22 are preferably juxtaposed such that seal members 24 of each element 20, 22 block slots 26 of another element 20, 22. This configuration reduces leakage through seal assembly 10. However, as an alternative embodiment, shown in FIG. 12, slots 26 can be provided in a non-staggered or aligned disposition between elements 20, 22. This may be advantageous where a certain amount of leakage between chambers $P_H$ and $P_L$ is acceptable or desired. FIG. 12 also illustrates another alternative embodiment in which seal assembly 10 is constructed of a number of elements 20, 22 that are not of uniform axial thickness.

Returning to FIGS. 3 and 4, each seal member 24 also preferably includes an angle α between their respective fixed end 28 and free end 30 thereof. The inwardly-extending angle α results in fixed end 28 being arranged at a non-perpendicular angle relative to a longitudinal axis of rotatable component 16 and free end 30 being arranged at an angle relative to fixed end 28 and toward rotatable component 16. The bend location of angle α is indicated in FIGS. 5–9 as line 34. FIG. 3 illustrates an angle α of approximately 135 degrees, which presents seal members 24 at approximately 45 degrees relative to rotating component 16. FIG. 4 illustrates an angle α of approximately 90 degrees, which presents seal members 24 at approximately 90 degrees, i.e., radial, relative to rotating component 16. It should be recognized that while two preferred angles have been presented, angle α may be set at any other angle that is necessary for the specific design in issue. Seal assembly 10 may also include a support 38 for supporting the angle α and seal members 24. Support 38 preferably bears a substantial portion of the seal assembly's differential pressure with minimal distortion during normal operating conditions. In either seal assembly configuration, angle α and support 38 provide relief between seal members 24 and holder 18. This relief functions to accommodate relative motion between non-rotating component 14 and rotating component 16 when seal members 24 rub on rotating component 16. Since the full length of seal member 24 may be deflected during such a rub, the seal member tip (free end) force on rotating component 16 is reduced. As mentioned above, a weld 36 may be provided through elements 20, 22 and support 38 to couple elements 20, 22 to holder 18.

Referring to FIG. 10, as an alternative embodiment, each seal member 24 may also include a circumferentially extending notch 40 at their respective free ends 30. In a preferred setting, each notch 40 faces a direction of rotation, indicated by arrow A, of rotatable component 16. A circumferentially extending mating notch 42 may also be provided in an opposite side of each free end 30. Notches 40 are advantageous, inter alia, to provide aerodynamic lift to minimize wear in those applications that anticipate a heavy transient rub. This situation may exist, for instance, where slots 26 are not staggered between elements 20, 22.

Figure 13:
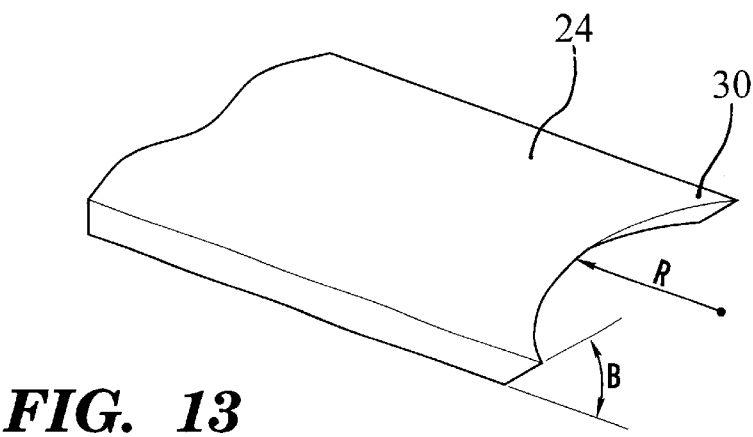
FIG. 13 shows a detail view of a seal member including alternative surfaces for mating with a rotating component of a rotary machine.

Another alternative embodiment is illustrated in FIG. 13, in which the free end 30 of each seal member 24 is formed to mate with a surface of rotating component 16. For example, free ends 30 may be formed or cut to include an angle β such that free end 30 is axially parallel a surface of rotatable component 16 when in operation. Angle β may be substantially similar to angle α. An additional alternative embodiment, shown in FIG. 13, includes having the free end 30 of each seal member 24 formed to be circumferentially parallel a surface of rotatable component 16. In this case, free end 30 of each seal member is formed or cut to a radius R to substantially mimic an outer diameter of rotating component 16.

It should be recognized that the seal assembly 10 in accordance with the present invention may be combined with one or more labyrinth seals and/or one or more brush seals (not shown) to provide further sealing capacity.

In operation, seal assembly 10 is carried by non-rotating component 14 in such a way that free ends 30 of seal members 24 slidably engage rotating component 16. As one with skill in the art will recognize, cold assembly of seal assembly 10 and rotary machine 12 may require non-contact of parts to accommodate eventual thermal expansion. Seal assembly 10 creates a seal between chambers $P_H$ and $P_L$ and seal members 24 resist flexure in one direction by the provision of angle α and support 38.

Figure 14A:
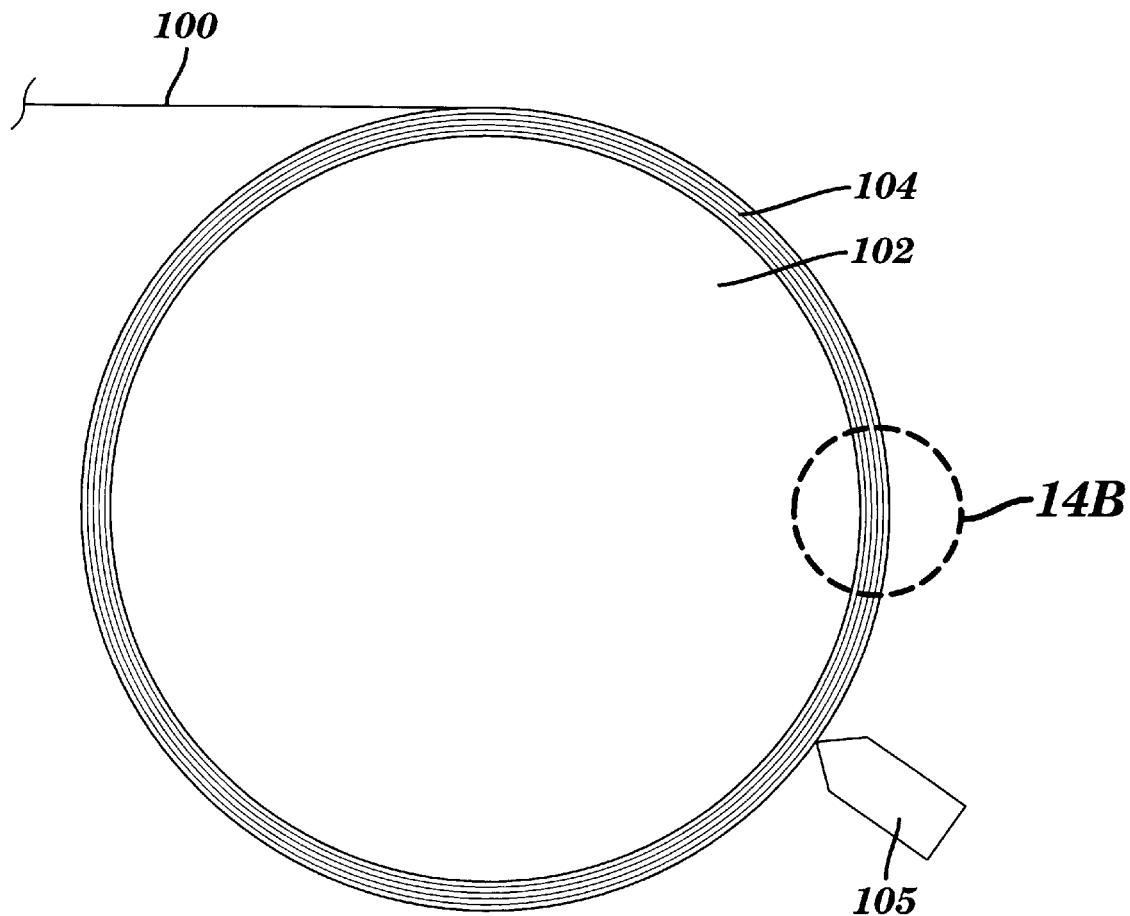
FIG. 14 shows a side view of a first embodiment of a method of fabrication of the seal assembly.
Figure 14B:

Referring to FIGS. 14–19, a first preferred embodiment for the fabrication of seal assembly 10 is illustrated. As shown in FIG. 14, a strip of material 100, preferably ribbon shim stock, of requisite thickness, width and material is first layered. Layering is preferably provided by winding strip of material 100 onto a mandrel 102 to form an annulus having a number of layers needed for a particular seal design. Mandrel 102 is preferably annular and has an outer diameter that is sized such that the outside diameter of the roll of material 104 once completed corresponds to an inside diameter of holder 18 or other structure to which seal assembly 10 is connected.

Figure 15:
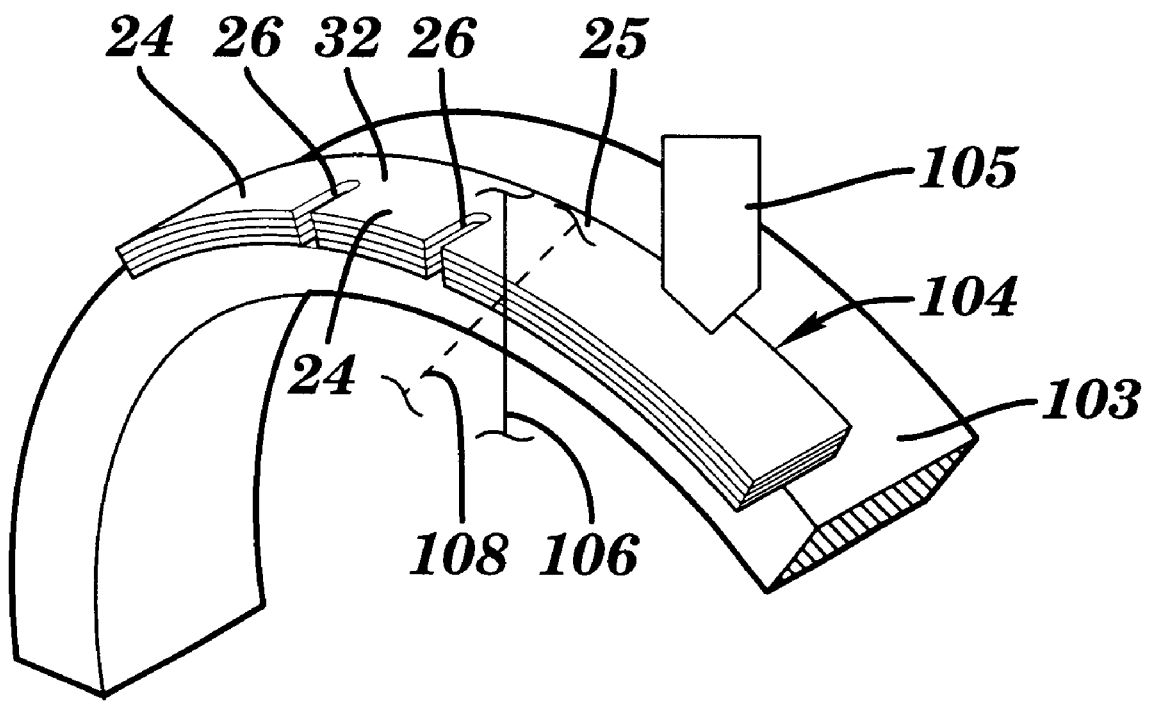
FIG. 15 shows a detail view of seal member slot cutting according to the method of fabrication.

Next, roll of material 104, part of which is shown in FIG. 15, is preferably transferred to a fixture 103, e.g., a ring fixture, for support. While supported on fixture 103, slots 26 are cut in an edge of material 104 to form the plurality of seal members 24 coupled to a band portion 32. Slots 26 extend through the thickness of roll of material 104. A preferred method of cutting slots 26 is using wire electro-discharge machining (EDM). EDM has been found advantageous because it does not raise a burr, can produce narrow slots (e.g., down to 0.002 inches), utilizes computer controlled positioning to readily produce complex shapes, and does not involve heavy tool force. It should be recognized, however, that other mechanisms of creating slots 26 may also be used. Furthermore, mandrel 102 may be so structured that the transfer of roll of material 104 may not be necessary.

As discussed above with reference to FIGS. 5–9, slots 26 may be provided in a variety of different shapes. For example, as illustrated in FIG. 15, slots 26 may be cut perpendicular relative to a surface 25 of elements 20, 22 (i.e., along line 106) and extend substantially perpendicular to free ends 30, i.e., radially relative to rotating component 16, once assembled. Alternatively, slots 26 may be cut at a non-perpendicular angle relative to surface 25 of elements 20, 22, i.e., along line 108. Wire EDM is capable of producing any slot geometry, shown in FIGS. 5–9, or other combination of geometries as may be required for a specific seal design.

If staggering of slats 26 is desired, it is preferably provided next by re-layering roll of material 104 such that seal members 24 of each element/layer block at least one slot 26 of another element/layer. Re-layering is preferably provided by winding roll of material 104 onto a mandrel (not shown) having different dimensions than mandrel 102, which repositions slots 26 to the desired staggered configuration. In this way, leaf seal members of one revolution block slots of at least one other revolution.

Next, a consolidation of roll of material 104 is provided by, for example, resistance welding 105 roll of material 104 through an edge of the roll of material that does not include slots 26, i.e., band portion 32. In this setting, whatever structure is supporting roll of material 104, e.g., mandrel 102 or fixture 103, may be made of, or coated with, a suitable material (not shown) to facilitate complete consolidation through roll of material 104.

Referring to FIGS. 16–19, the next step of fabrication is to form angle α in each seal member 24. As indicated above, seal members may be provided with an angle α of, for example, approximately 135 degree or of approximately 90 degrees. As illustrated in FIGS. 16–19, one method of providing angle α is to clamp 110 slotted roll of material 104 to a mandrel 112, 212. Mandrel 112 (FIGS. 16 and 17) provides the approximately 135 degree angle and mandrel 212 (FIGS. 18 and 19) provides the approximately 90 degree angle. In the case of mandrel 112, forming angle α results in an inwardly frusto-conically shaped portion having the plurality of spaced leaf seal members 24 with slots 26 therebetween that is coextensive with band portion 32 and extends inwardly from band portion 32 towards rotatable component 16. In either case, the slotted material 104 is secured to a mandrel with geometry needed to form angle α in seal members 24. Consideration for material properties that affect spring back from mandrel 112, 212 shape should be anticipated in choosing mandrel 112, 212. Forcing seal members 24 to conformity with mandrel 112, 212 would include those techniques applied in sheet metal fabrication such as peening or rolling, but may include pressure forming, hydrostatic forming, explosive forming or any other now known or later developed technique.

Next, band portions 32 are coupled to non-rotating component 14, e.g., a stator body, of rotary machine 12. As discussed above, elements 20, 22 and support 38 are preferably welded to holder 18, which is coupled to non-rotating component 14. Seal members 24 are mounted in such as way that they slidably engage rotating component 16 of rotary machine 12, when in operation, to seal the pressurized chambers $P_H$ and $P_L$. In a preferred embodiment, holder 18 is an annulus with a cross-sectional geometry capable of mounting either of seal assembly configuration discussed above. Compatible structure, e.g., key slot 19, for holder 18 is provided in non-rotating component 14 in a known fashion to maintain seal concentricity with rotating component 16 and secure holder 18 from rotation.

An alternative step to the above-described process may include separating roll of material 104 after connection to annular holder 18 into arcuate segments so that a number of seal assemblies 10 may be circumferentially arranged about rotating component 16, as shown in FIG. 2. Segmentation of seal assembly 10 is advantageous for shipping, handling and assembly requirements. In addition, segmented seal assemblies 10 makes replacement easier. Segmentation is preferably provided by making radial, narrow kurf cuts by wire EDM in roll of material 104 and annular holder 18. As with an annular seal assembly, provisions for anti-rotation of arcuate seal assemblies, such as those used in brush seal applications, may be provided to complete the fabrication.

Another alternative step includes forming free ends 30 of seal members 24 to conform to a surface of rotating component 16, as shown in FIG. 13. That is, shape free ends 30 to be axially parallel a surface of rotatable component 16 and/or circumferentially parallel a surface of rotatable component 16. Furthermore, notches 40, 42 may be provided at this stage where slots 26 are not staggered. Precise numerical control of the wire EDM operation can accommodate the above features.

Figure 20A:
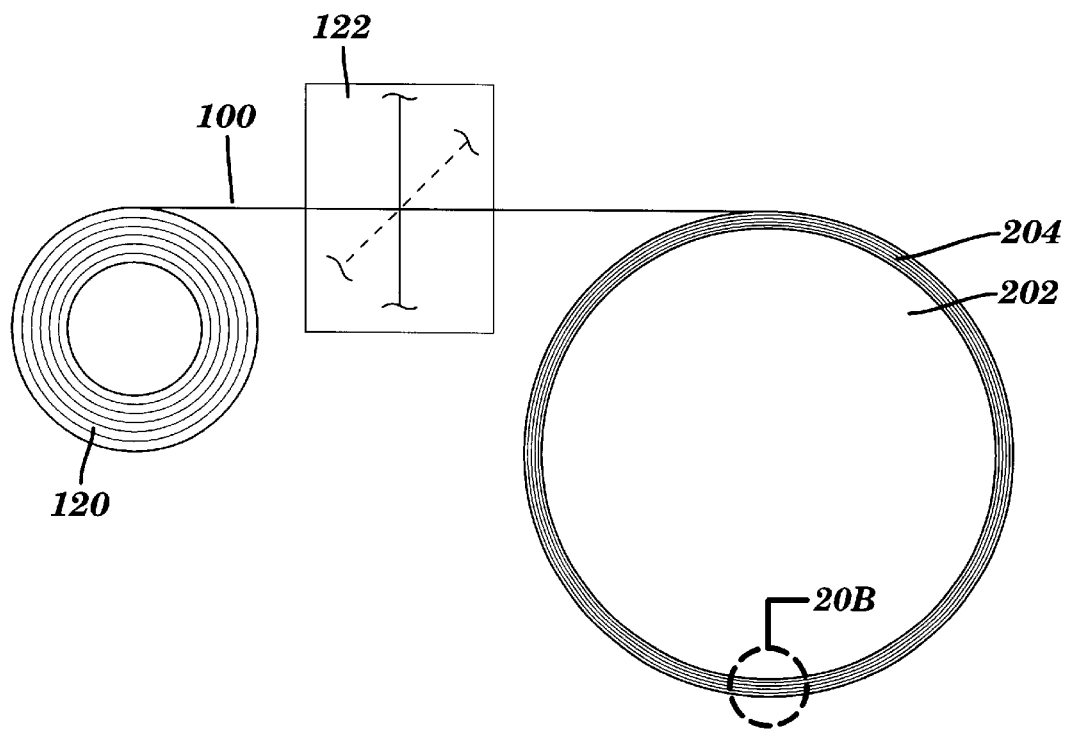
FIG. 20 shows a side view of a second embodiment of a method of fabrication of the seal assembly.
Figure 20B:
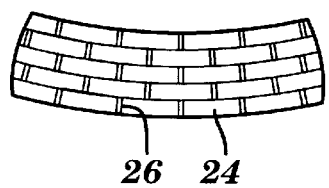
Figure 16:
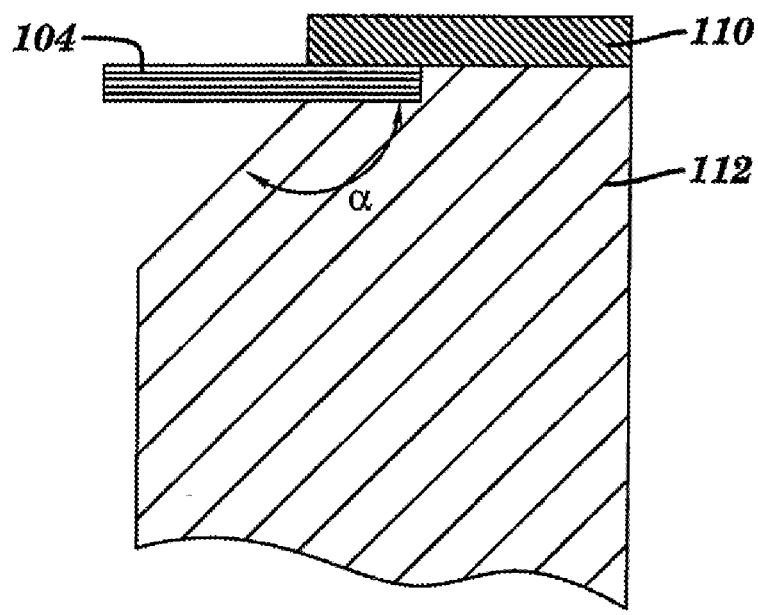
Figure 17:
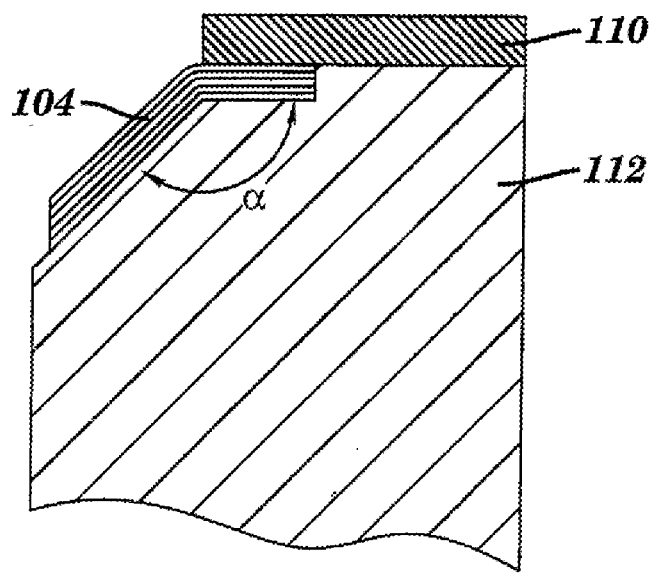

Referring to FIG. 20, an alternative embodiment of the method of fabrication is illustrated in which the step of cutting slots 26 into an edge of the strip of material 100 precedes the step of layering the strip of material 100. In this approach, a strip of material 100 is provided from a stock of material 120 and is slotted one individual layer at a time as it is fed through an EDM machine 122. Any of the slot geometries discussed above may be provided by EDM machine 122. The slotted material is then wound on a mandrel 202, as described above, to produce a roll of material 204 having an outer diameter that corresponds to an inner diameter of holder 18 or other structure to which seal assembly 10 is to be mounted.

This method can also automatically produce multiple layers of elements 20, 22 that have staggered slots 26 as shown in the enlarged view of roll of material 204, shown in FIG. 20. That is, elements 20, 22 are juxtaposed such that seal members of each element/layer block slots of another element/layer.

The rest of the process of fabrication in accordance with the second preferred embodiment is substantially similar to that of the first embodiment.

The present invention also includes a method of inhibiting fluid flow through an annular slot (i.e., chambers $P_H$ and $P_L$) defined between a stator body 14 and a rotor 16 received in the stator body 14, the rotor having longitudinal axis 15 (FIG. 1), the method including the steps of: disposing on the stator body 14 a plurality of arcuate elements 20, 22 each having a band portion 32 and an integral plurality of circumferentially disposed seal members 24 having slots 26 therebetween, wherein the seal members 24 includes an angle α therein and extend inwardly from the stator body at an angle relative to the longitudinal axis to slidably contact rotor 16 along a circumference thereof; circumferentially aligning and axially juxtaposing elements 20, 22; employing the cooperatively disposed elements 20, 22 to define an annular seal extending between the stator body 14 and the rotor 16; and inhibiting fluid flow through the annular slot with the annular seal.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A seal assembly for sealing against a rotatable component having a longitudinal axis, the seal assembly comprising:
   a first element including a plurality of spaced leaf seal members having slots therebetween;
   a second element including a plurality of spaced leaf seal members having slots therebetween;
   wherein each leaf seal member includes a fixed portion that is arranged at a non-perpendicular angle relative to a longitudinal axis of the rotatable component and a free portion arranged at an angle relative to the fixed portion and toward the rotatable component, and the free portions slidably engage the rotatable component at a non-perpendicular angle relative to the longitudinal axis to seal; and
   a support for supporting the angle of each leaf seal member.

2. The seal assembly of claim 1, wherein the elements are provided by a spiral of a single strip of material.

3. The seal assembly of claim 1, wherein the elements are fixed together at the fixed portion of each leaf seal member by a weld.

4. The seal assembly of claim 1, wherein the fixed portion of each leaf seal member is provided by an integral band portion of each element.

5. The seal assembly of claim 1, wherein each leaf seal member includes a circumferentially extending notch at their respective free portions.

6. The seal assembly of claim 5, wherein each notch faces a direction of rotation of the rotatable component.

7. The seal assembly of claim 1, wherein the free portion of each leaf seal member is axially parallel a surface of the rotatable component.

8. The seal assembly of claim 1, wherein the free portion of each leaf seal member is circumferentially parallel a surface of the rotatable component.

9. The seal assembly of claim 1, wherein the leaf seal member angle is approximately 135 degrees.

10. The seal assembly of claim 1, wherein the leaf seal members are non-uniformly spaced.

11. The seal assembly of claim 1, wherein the slots diverge at least partially from the fixed portion towards the free portion.

12. The seal assembly of claim 1, wherein the elements are juxtaposed such that leaf seal members of each element block slots of another element.

13. A rotary machine comprising:
   a rotatable component and a non-rotatable component, the components lying about a common axis;
   a seal assembly between the components, the seal assembly including:
      a plurality of juxtaposed elements, each element including a plurality of spaced leaf seal members defining slots therebetween, each leaf seal member including a fixed portion that is arranged at a non-perpendicular angle relative to a longitudinal axis of the rotatable component and a free portion arranged at an inwardly-extending angle to the fix portion and toward the rotatable component, wherein the free portions slidably engage the rotatable component to seal thereagainst; and
      a support for supporting the fixed portion and the free portion at the angle of each leaf seal member.

14. The rotary machine of claim 13, wherein each slot extends substantially perpendicular to the free portion of each leaf seal member.

15. The rotary machine of claim 13, wherein the elements are provided by a spiral of a single strip of material.

16. The rotary machine of claim 13, wherein the slots are provided at an angle relative to a surface of each element.

17. The rotary machine of claim 13, wherein the slots diverge at least partially from the fixed portion to the free portion.

18. The rotary machine of claim 13, wherein the seal assembly is arcuate.

19. The rotary machine of claim 18, further comprising a plurality of seal assemblies circumferentially arranged about the rotatable component.

20. The rotary machine of claim 13, wherein the elements are juxtaposed such that leaf seal members of each element block slots of another element.

21. A method of fabricating a seal assembly for sealing pressurized chambers of a rotary machine, the method comprising the steps of:
   (a) cutting slots into and edge strip of a material to form a plurality of leaf seal members coupled to a band portion;
   (b) layering the strip of material into an annular shape;
   (c) securing layers of the band portion together;
   (d) forming an inwardly extending angle in the leaf seal members;
   (e) coupling the band portion to a stator body of the rotary machine such that the leaf seal members slidably engage a rotor of the rotary machine when in operation, to seal the pressurized chambers; and
   (f) supporting the inwardly extending angle in the leaf seal member with a support.

22. The method of claim 21, wherein the step of layering precedes the step of cutting.

23. The method of claim 22, wherein the step of layering includes winding the strip of material about an annular mandrel to form a layered annulus.

24. The method of claim 21, further comprising the step of re-layering the material prior to the step of securing such that leaf seal members of each layer block slots of another layer.

25. The method of claim 21, further comprising the step of segmenting the strip of material into arcuate sections.

26. The method of claim wherein 21, the step of layering includes positioning the seal members such that leaf seal members of each layer block slots of another layer.

27. A seal assembly for sealing within a rotary machine having a stator and a rotor, the seal assembly comprising:
   a strip of material layered upon itself to form a substantially annular shape with at least two revolutions, the strip of material including:
      a band portion fixed to the stator such that the band portion is non-perpendicular relative to a longitudinal axis of the rotor;
      an inwardly frusto-conically shaped portion including a plurality of spaced leaf seal members with slots therebetween coextensive with the band portion;
      wherein leaf seal members of one revolution block slots of at least one other revolution, and the plurality of leaf seal members slidably engage the rotor to seal; and
      a support for supporting the frusto-conically shaped portion.

* * * * *

UNITED STATES PATENT AND TRADEMARK OFFICE
CERTIFICATE OF CORRECTION

Figure 16:
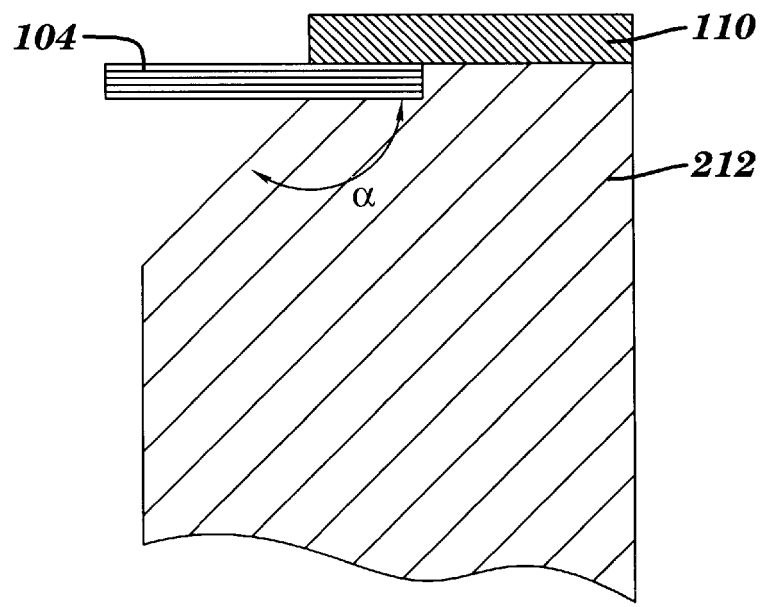
FIG. 16 shows a detail view of the seal assembly shown in FIG. 3 prior to formation of a seal member angle.
Figure 17:
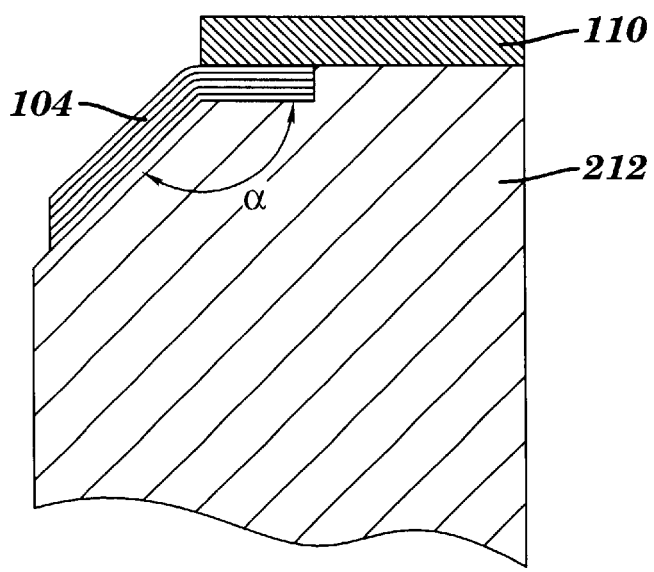
FIG. 17 shows a detail view of angle formation of the seal assembly shown in FIG. 3.
Figure 18:
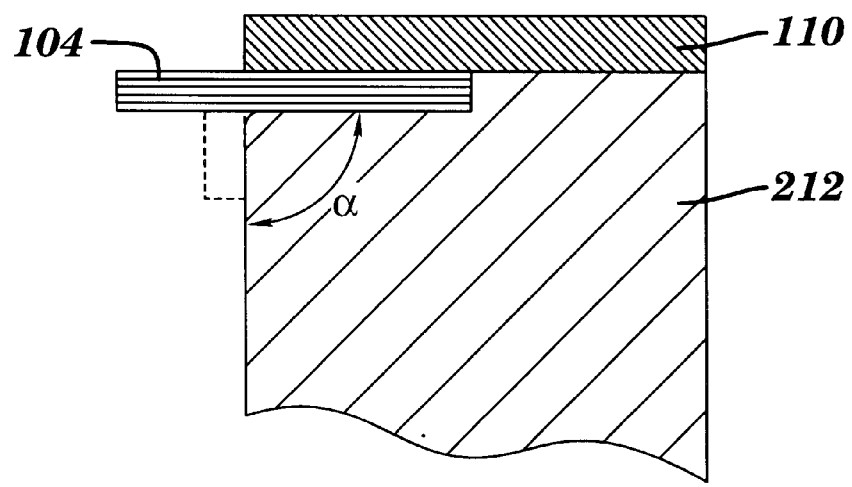
FIG. 18 shows a detail view of the seal assembly shown in FIG. 4 prior to formation of the seal member angle.
Figure 19:
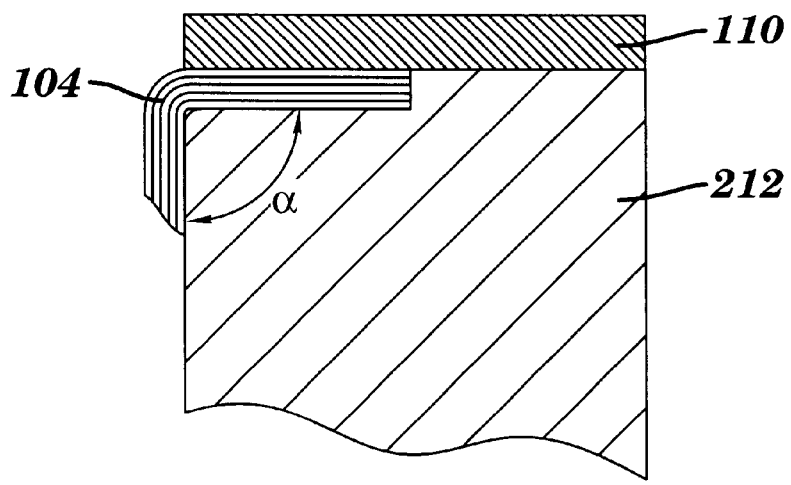
FIG. 19 shows a detail view of angle formation of the seal assembly shown in FIG. 4.

PATENT NO. : 6,644,667 B2
APPLICATION NO. : 09/791248
DATED : November 11, 2003
INVENTOR(S) : Clayton M. Grondahl It is certified that error appears in the above-identified patent and that said Letters Patent is hereby corrected as shown below:

The sheet of drawing, consisting of Figs. 16 & 17 should be deleted to appear as per attached sheet.

Column 7, Line 11, Delete "slats" and insert -- slots -- ;
Column 9, Line 59, Delete "fix" and insert -- fixed -- ;
Column 10, Line 46, Delete "wherein 21," and insert -- 21, wherein -- .

Signed and Sealed this

Twenty-fourth Day of October, 2006

JON W. DUDAS
*Director of the United States Patent and Trademark Office*